(12) United States Patent
Takamiya et al.

(10) Patent No.: US 10,473,765 B2
(45) Date of Patent: Nov. 12, 2019

(54) PHOTOELECTRIC SENSOR

(71) Applicant: AZBIL CORPORATION, Chiyoda-ku (JP)

(72) Inventors: Tomohiro Takamiya, Chiyoda-ku (JP); Minoru Tanaka, Chiyoda-ku (JP)

(73) Assignee: AZBIL CORPORATION, Chiyoda-ku (JP)

( * ) Notice: Subject to any disclaimer, the term of this patent is extended or adjusted under 35 U.S.C. 154(b) by 496 days.

(21) Appl. No.: 15/291,509

(22) Filed: Oct. 12, 2016

(65) Prior Publication Data

US 2017/0108582 A1    Apr. 20, 2017

(30) Foreign Application Priority Data

Oct. 15, 2015  (JP) ................................. 2015-203677

(51) Int. Cl.
| | | |
|---|---|---|
| *G01S 7/00* | (2006.01) | |
| *G01S 7/481* | (2006.01) | |
| *G01S 17/02* | (2006.01) | |
| *G01S 17/48* | (2006.01) | |
| *G01S 17/08* | (2006.01) | |
| *G02B 3/02* | (2006.01) | |
| *G02B 3/06* | (2006.01) | |
| *G02B 19/00* | (2006.01) | |

(52) U.S. Cl.
CPC .......... *G01S 7/4814* (2013.01); *G01S 17/026* (2013.01); *G01S 17/08* (2013.01); *G01S 17/48* (2013.01); *G02B 3/02* (2013.01); *G02B 3/06* (2013.01); *G02B 19/0085* (2013.01)

(58) Field of Classification Search
USPC ........................................................ 356/4.01
See application file for complete search history.

(56) References Cited

U.S. PATENT DOCUMENTS

| | | | | |
|---|---|---|---|---|
| 3,519,829 A | * | 7/1970 | Richter | .................... G01C 3/04 250/216 |
| 4,330,202 A | * | 5/1982 | Yokota | ..................... G01C 3/02 356/3.02 |

(Continued)

FOREIGN PATENT DOCUMENTS

| | | |
|---|---|---|
| CN | 1821711 A | 8/2006 |
| CN | 104569996 A | 4/2015 |

(Continued)

OTHER PUBLICATIONS

Combined Chinese Office Action and Search Report dated Apr. 24, 2019 in Patent Application No. 201610885317.7, 8 pages (with English Translation of Category of Cited Documents).

(Continued)

*Primary Examiner* — James R Hulka
(74) *Attorney, Agent, or Firm* — Oblon, McClelland, Maier & Neustadt, L.L.P.

(57) ABSTRACT

A photoelectric sensor includes a lens mounted to a light projecting element at a position that opposes a light projecting lens and configured such that the curvature in the direction perpendicular to a straight line passing through the center of the light projecting lens and the center of the light receiving lens is greater than the curvature in the direction parallel to the straight line passing through the center of the light projecting lens and the center of the light receiving lens.

5 Claims, 5 Drawing Sheets

(56) References Cited

U.S. PATENT DOCUMENTS

| | | | | |
|---|---|---|---|---|
| 4,483,613 A | * | 11/1984 | Yokota | G01C 3/02 |
| | | | | 356/3.02 |
| 4,865,435 A | * | 9/1989 | Cho | G02B 13/18 |
| | | | | 359/716 |
| 5,815,747 A | * | 9/1998 | Mori | G02B 7/28 |
| | | | | 396/91 |
| 6,215,959 B1 | * | 4/2001 | Mori | G02B 7/28 |
| | | | | 396/91 |

FOREIGN PATENT DOCUMENTS

| | | |
|---|---|---|
| JP | S57-104803 | 6/1982 |
| JP | 04-013989 | 1/1992 |
| JP | 08-15412 | 1/1996 |
| JP | 10-161008 | 6/1998 |

OTHER PUBLICATIONS

Office Action dated Jul. 9, 2019, in corresponding Japanese Patent Application No. 2015-203677, citing document AO-AQ therein, 3 pages.

\* cited by examiner

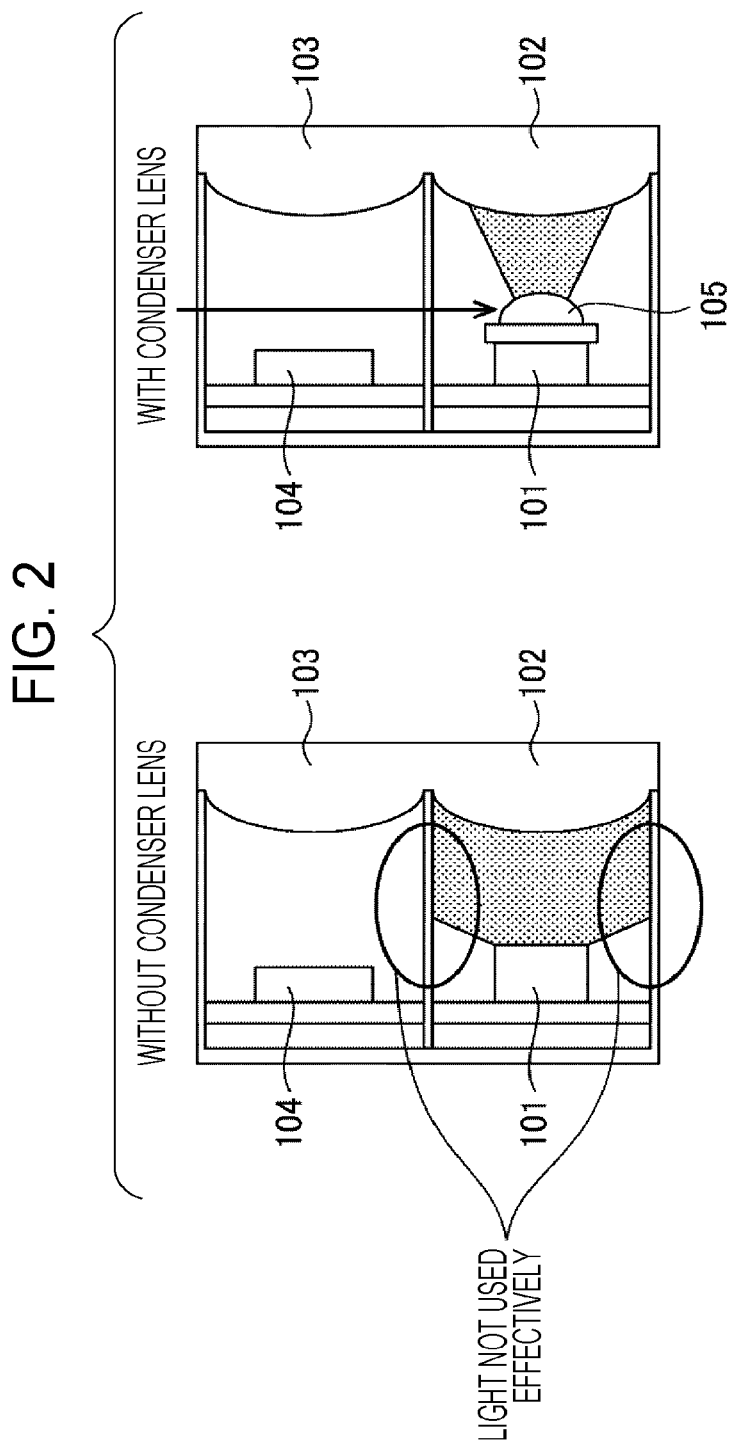

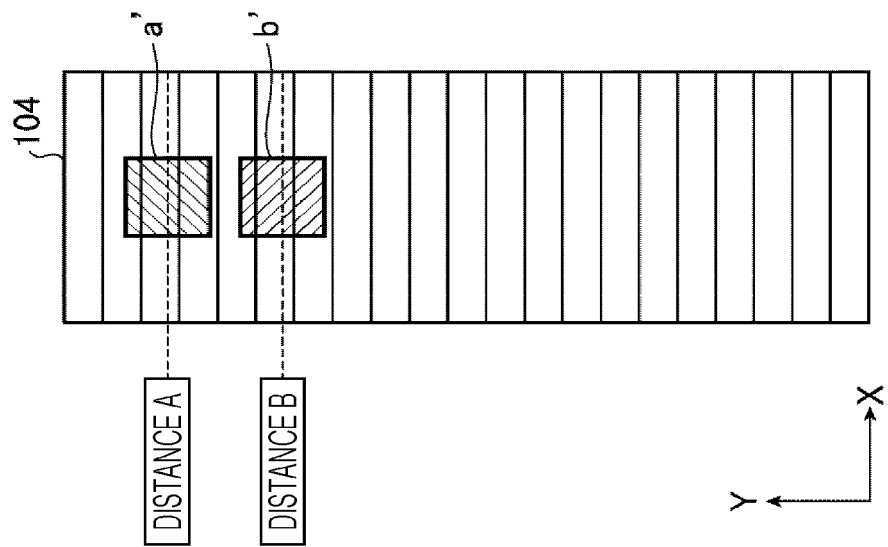
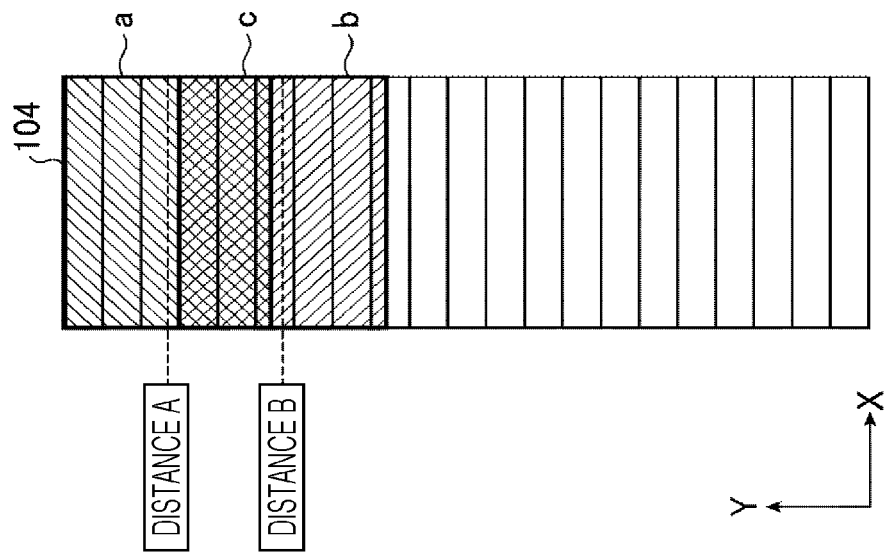

X-DIRECTION

Y-DIRECTION

PHOTOELECTRIC SENSOR

CROSS-REFERENCE TO RELATED APPLICATIONS

This application claims the benefit of and priority to Japanese Patent Application No. 2015-203677, filed on Oct. 15, 2015, the entire contents of which are incorporated by reference herein.

BACKGROUND OF THE INVENTION

1. Field of the Invention

The present invention relates to a distance-settable photoelectric sensor that is based on the principle of triangulation and in which an optical system is constituted by mounting a condenser lens to a light projecting element.

2. Description of the Related Art

Conventionally, distance-settable photoelectric sensors that are based on the principle of triangulation are known.

First, the principle of triangulation, which is employed in a typical distance-settable photoelectric sensor, and the mechanism for using projected light effectively by mounting a condenser lens to a distance-settable photoelectric sensor will be described with reference to FIGS. 1A and 1B.

As illustrated in FIG. 1B, in a distance-settable photoelectric sensor, for example, light emitted by a light projecting element 101, such as a light projecting LED, that serves as a light emitting source is projected onto a detection region by a light projecting lens 102 to irradiate the surface of an object 20. Then, (a portion of) the light reflected and diffused by the surface of the object 20 is condensed by a light receiving lens 103 and received by a light receiving element 104.

The light receiving element 104 is, for example, a light receiving element, such as a multi-segment photodiode, and receives the light reflected and diffused by the surface of the object 20 at a position corresponding to the distance in each of the cases in which the object 20 is at a distance A of a relatively small distance and in which the object 20 is at a distance B of a relatively large distance, as illustrated in FIG. 1B. In other words, the light receiving position on the light receiving element 104 changes in accordance with the distance to the object 20.

Therefore, the distance to the object 20 can be measured by detecting the light receiving position on the light receiving element 104.

Meanwhile, with regard to photoelectric sensors, conventionally, a technique in which a spherical condenser lens is mounted to a light emitting element or a light receiving element to constitute an optical system is disclosed (e.g., Japanese Unexamined Patent Application Publication No. 4-13989).

Affixing the condenser lens makes it possible to increase the quantity of light by condensing the projected light. Thus, this technique is employed in a distance-settable photoelectric sensor illustrated in FIG. 1A, and a spherical condenser lens 105 is mounted to the light projecting element 101 illustrated in FIG. 1B so as to effectively use the light from the light projecting element 101.

FIG. 2 is an illustration for describing the effect of the condenser lens.

As illustrated in FIG. 2, mounting the condenser lens 105 to the light projecting element 101 makes it possible to effectively use the projected light, and the light projection power greatly improves.

FIG. 3A illustrates a change in the light receiving range on the light receiving element 104 in a case in which the spherical condenser lens 105 is mounted to the light projecting element 101 in a photoelectric sensor such as the one illustrated in FIGS. 1A and 1B, for example. A portion indicated by a in FIG. 3A is the light receiving range on the light receiving element 104 in the case in which the object 20 is at the distance A, and a portion indicated by b is the light receiving range on the light receiving element 104 in the case in which the object 20 is at the distance B. In addition, a portion indicated by c in FIG. 3A is a portion in which the light receiving range a and the light receiving range b overlap.

When the spherical condenser lens 105 is mounted to the light projecting element 101, the light receiving range increases, as illustrated in FIG. 3A.

In other words, when the spherical condenser lens 105 is mounted to the light projecting element 101, the width of the light receiving distribution on the light receiving element 104 increases both in the X-direction and in the Y-direction, or in other words, increases both in the lateral direction and in the longitudinal direction along the surface that receives the light that has passed through the light receiving lens 103.

In contrast, FIG. 3B illustrates a change in the light receiving range on a light receiving element in a case in which the condenser lens 105 as illustrated in FIG. 1A is not mounted to a light emitting element and a light receiving element in a typical distance-settable photoelectric sensor, or in other words, illustrates a change in the light receiving range on the light receiving element illustrated in FIG. 1B.

As compared to the light receiving range illustrated in FIG. 3A, the light receiving range on the light receiving element is smaller in FIG. 3B than in FIG. 3A (refer to a' and b' in FIG. 3B).

However, if the light receiving width in the Y-direction increases as the condenser lens 105 is mounted, there is a problem in that, when the change in the position of the object 20 is small, for example, this change in the position of the object 20 may not be detected with accuracy.

Specifically, when the position of the object 20 changes from the distance B to the distance A, the light receiving range on the light receiving element 104 also changes from b to a, as illustrated in FIG. 3A. However, since b and a overlap in the range indicated by c in FIG. 3A, the amount of change in the light receiving signal on the light receiving element 104 is small, which makes it hard to determine that the distance to the object 20 has changed.

SUMMARY OF THE INVENTION

The present invention has been made to solve the above-described problem and is directed to providing a photoelectric sensor with improved performance in which the sensitivity to a change in the position of an object is enhanced by increasing the quantity of light from a light projecting element and by preventing the spot size of light received by a light receiving element from increasing.

A photoelectric sensor according to an aspect of the present invention includes a light projecting element configured to project light onto an object through a light projecting lens and a light receiving element configured to receive the light reflected and diffused by the object through a light receiving lens, and is configured to measure or determine a distance to the object on the basis of a light receiving position on the light receiving element. The photoelectric sensor includes a lens mounted to the light projecting element at a position that opposes the light projecting lens and configured such that a curvature in a direction perpendicular to a straight line passing through a center of the light projecting lens and a center of the light receiving lens is greater than a curvature in a direction parallel to the straight line passing through the center of the light projecting lens and the center of the light receiving lens.

According to the present invention, a photoelectric sensor with improved performance can be provided by increasing the quantity of light from the light projecting element and by preventing the spot size of the light received by the light receiving element from increasing.

BRIEF DESCRIPTION OF THE DRAWINGS

FIGS. 1A and 1B are illustrations for describing a distance-settable photoelectric sensor, in which FIG. 1B is an illustration for describing the principle of triangulation employed in a typical distance-settable photoelectric sensor, and FIG. 1A is an illustration for describing a case in which a condenser lens is mounted to a distance-settable photoelectric sensor;

FIG. 2 is an illustration for describing the effect of the condenser lens;

FIGS. 3A and 3B illustrate a change in the light receiving position on a light receiving element in a case in which a spherical condenser lens is mounted to a light projecting element in a photoelectric sensor such as the one illustrated in FIGS. 1A and 1B;

DESCRIPTION OF THE PREFERRED EMBODIMENTS

Hereinafter, an embodiment of the present invention will be described in detail with reference to the drawings.

First Embodiment

Figure 4:
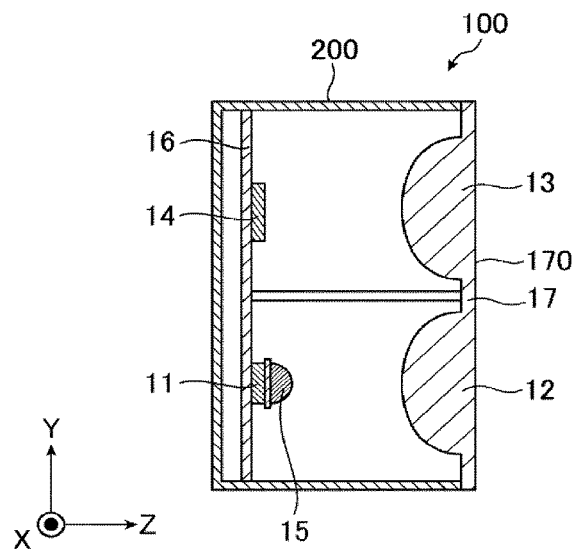
FIG. 4 is a sectional view of a photoelectric sensor according to a first embodiment of the present invention.

FIG. 4 is a sectional view of a photoelectric sensor 100 according to a first embodiment of the present invention.

As illustrated in FIG. 4, in the photoelectric sensor 100, a light projecting element 11 and a light receiving element 14 are mounted to a printed board 16 provided on a back surface of a holder 200 of the photoelectric sensor 100.

In addition, in the photoelectric sensor 100, a lens body 17 in which a light projecting lens 12 and a light receiving lens 13 are integrally formed is mounted to a lens mounting portion 170 provided in a front surface portion of the holder 200 of the photoelectric sensor 100.

Figure 1A:
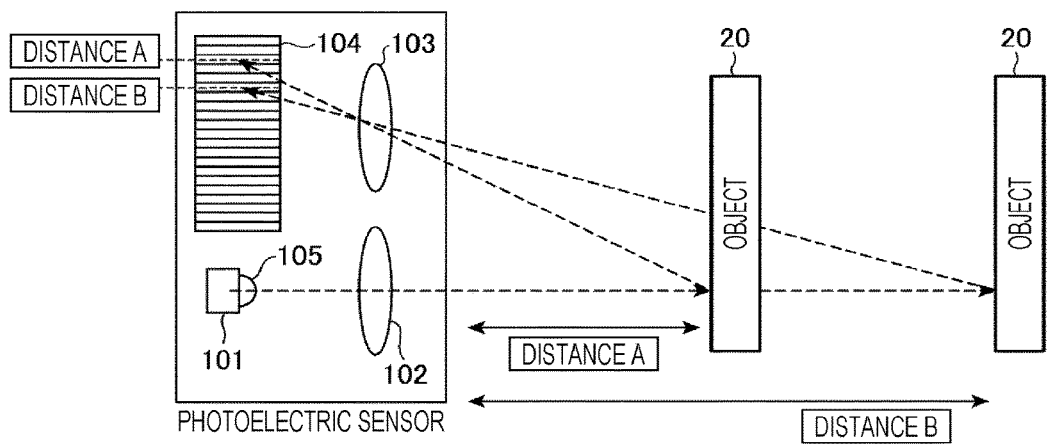
Figure 1B:
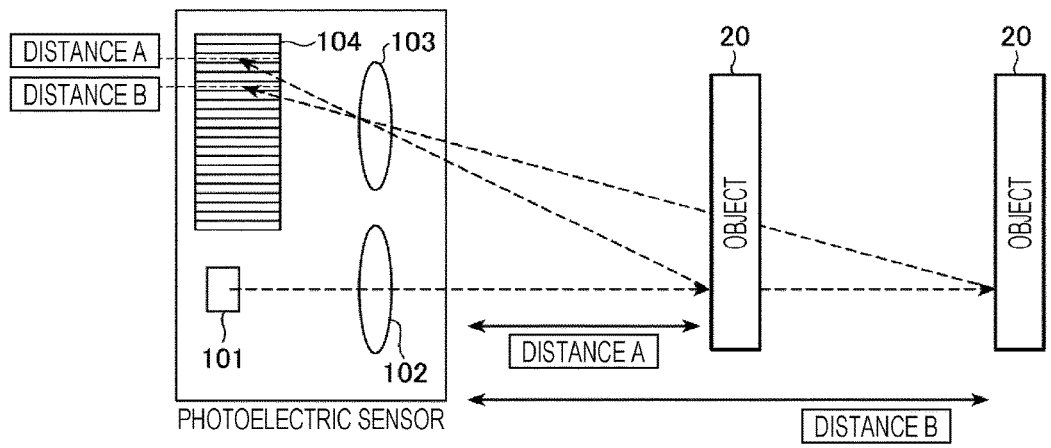

The photoelectric sensor 100 according to the first embodiment is a photoelectric sensor 100 that is based on the principle of triangulation, as in the conventional distance-settable photoelectric sensor described with reference to FIGS. 1A and 1B, and measures the distance to an object 20 in accordance with the principle of triangulation (this will be described in detail later).

The light projecting element 11 projects light onto an object through the light projecting lens 12. The light projecting element 11 is constituted, for example, by a light emitting diode (LED).

The light projecting lens 12 projects the light emitted by the light projecting element 11 onto a detection region.

The light receiving lens 13 condenses the light that has been projected by a light source, or in other words, by the light projecting element 11 and reflected and diffused by the surface of the object 20.

The light receiving element 14 receives the light condensed by the light receiving lens 13 through the light receiving lens 13. The light receiving element 14 is constituted, for example, by a multi-segment photodiode.

A distance calculation unit (omitted in the drawings) of the photoelectric sensor 100 calculates the distance to the object 20 on the basis of the light receiving range of the light received by the light receiving element 14.

In the photoelectric sensor 100 according to the first embodiment, a condenser lens 15 having a biconic shape is mounted to the front of the light projecting element 11, or in other words, at a position that opposes the light projecting lens 12. The condenser lens 15 having a biconic shape condenses the light projected by the light projecting element 11 in a similar manner to the spherical condenser lens 105.

Although the condenser lens 15 is mounted to the light projecting element 11 by being affixed thereto in the first embodiment, this is not a limiting example. The condenser lens 15 may, for example, be mounted to the light projecting element 11 with the use of a mounting device, and it suffices that the condenser lens 15 be provided on the front of the light projecting element 11, or in other words, at a position on the light projecting element 11 that opposes the light projecting lens 12.

Figure 5:
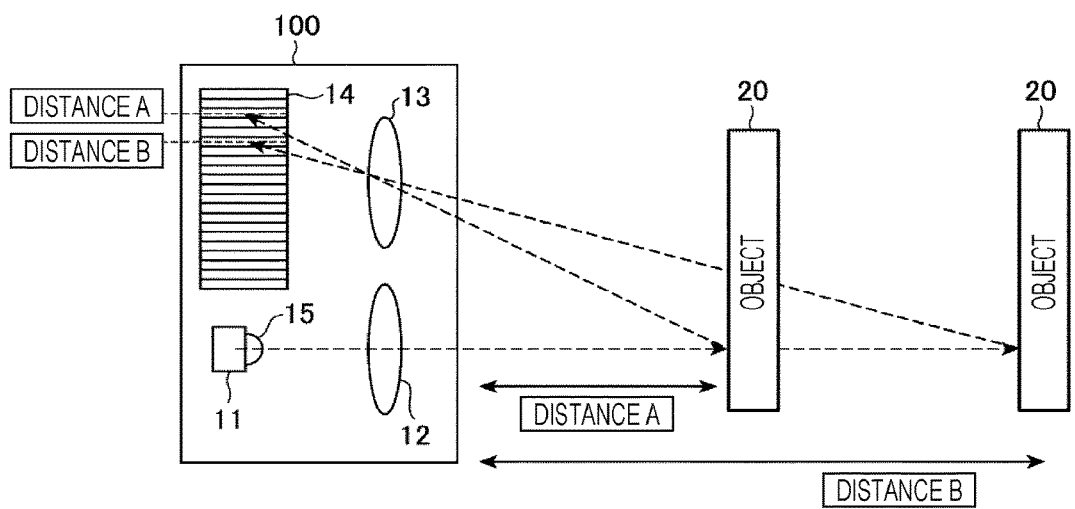
FIG. 5 is an illustration for describing the principle of triangulation employed in the photoelectric sensor according to the first embodiment of the present invention.

FIG. 5 is an illustration for describing the principle of triangulation employed in the photoelectric sensor 100 according to the first embodiment of the present invention. The photoelectric sensor 100 measures the distance to the object 20 in accordance with the stated principle.

As illustrated in FIG. 5, the light emitted by the light projecting element 11, which serves as a light emitting source, is projected onto a detection region by the light projecting lens 12 to irradiate the surface of the object 20. Then, a portion of the light reflected and diffused by the surface of the object 20 is condensed by the light receiving lens 13, passes through the light receiving lens 13, and is received by the light receiving element 14.

The light receiving element 14, for example, is a light receiving element, such as a multi-segment photodiode, and receives the light reflected and diffused by the surface of the object 20 at a position corresponding to the distance in each of the cases in which the object 20 is at the distance A of a relatively small distance and in which the object 20 is at the distance B of a relatively large distance, as illustrated in FIG. 5. In other words, the light receiving position changes in accordance with the distance to the object 20.

Therefore, the distance to the object 20 can be measured by detecting the light receiving position on the light receiving element 14.

The photoelectric sensor according to the present invention may be an apparatus that measures the distance to the object 20 in accordance with the above-described method and provides the value of the stated distance to a user or may be an apparatus that determines whether the value of the stated distance falls within a certain range set in advance and provides the determination result to a user.

Now, the condenser lens 15 having a biconic shape provided on the light projecting element 11 will be described in detail.

Figure 6A:
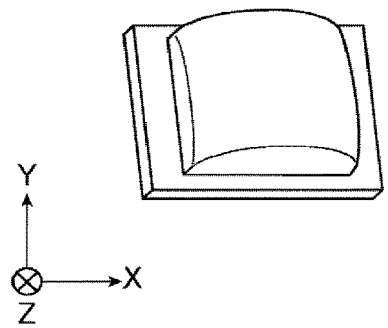
FIGS. 6A through 6C are illustrations for describing a lens having a typical biconic shape.
Figure 6B:
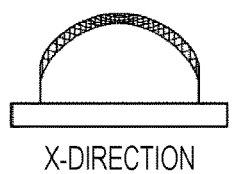
Figure 6C:
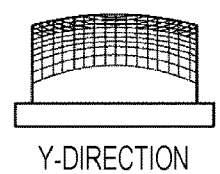

FIGS. 6A through 6C are illustrations for describing a lens having a typical biconic shape.

A biconic shape is a shape that has mutually different curvatures in the orthogonal directions of a lens, or in other words, in the X-direction and in the Y-direction in a state in which the convex surface of the lens faces upward (refer to FIG. 6A).

Here, as illustrated in FIGS. 6A through 6C, the condenser lens 15 is formed such that its curvature in the X-direction is greater than its curvature in the Y-direction (refer to FIGS. 6B and 6C).

In the first embodiment, a lens having a biconic shape such as the one illustrated in FIGS. 6A through 6C serves as the condenser lens 15, and the condenser lens 15 is affixed and mounted to the light projecting element 11 in such a manner that the direction perpendicular to a straight line passing through the center of the light projecting lens 12 and the center of the light receiving lens 13 corresponds to the X-direction and the direction parallel to the straight line passing through the center of the light projecting lens 12 and the center of the light receiving lens 13 corresponds to the Y-direction.

In other words, the condenser lens 15 is affixed to the light projecting element 11 in such a manner that the curvature of the condenser lens 15 in the direction perpendicular to the straight line passing through the center of the light projecting lens 12 and the center of the light receiving lens 13 is greater than the curvature of the condenser lens 15 in the direction parallel to the straight line passing through the center of the light projecting lens 12 and the center of the light receiving lens 13 along the surface that opposes the light projecting lens 12.

The aforementioned directions do not necessarily have to be perpendicular herein and may be substantially perpendicular. In addition, the aforementioned directions do not necessarily have to be parallel herein and may be substantially parallel.

Figure 7:
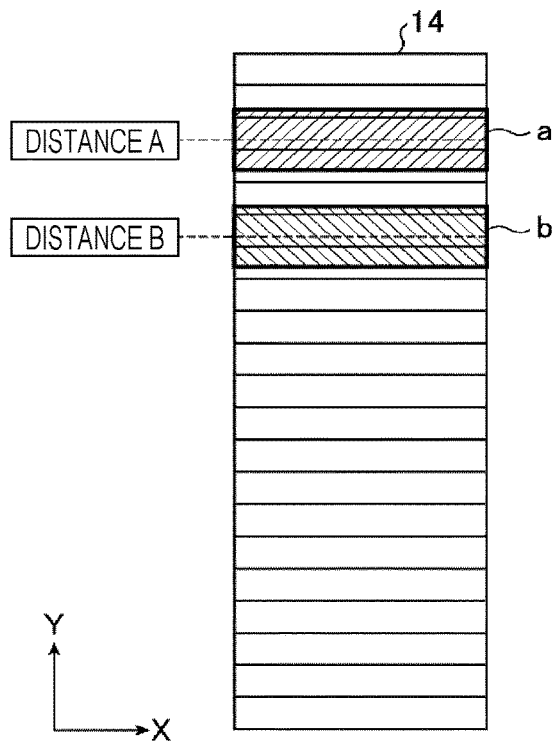
FIG. 7 illustrates a change in the light receiving position on a light receiving element of the photoelectric sensor according to the first embodiment in which a condenser lens having a biconic shape is affixed to a light projecting element.

FIG. 7 illustrates a change in the light receiving range on the light receiving element 14 of the photoelectric sensor 100 according to the first embodiment in which the condenser lens 15 having a biconic shape is affixed to the light projecting element 11. A portion indicated by a in FIG. 7 is the light receiving range on the light receiving element 14 in the case in which the object 20 is at the distance A, and a portion indicated by b is the light receiving range on the light receiving element 14 in the case in which the object 20 is at the distance B.

Since the condenser lens 15 is constituted by a lens having a biconic shape, as illustrated in FIG. 7, the width of the light receiving range in the Y-direction, or in other words, in the longitudinal direction along the surface that receives the light that has passed through the light receiving lens 13 is smaller than the width of the light receiving range in the X-direction, or in other words, in the lateral direction along the surface that receives the light that has passed through the light receiving lens 13, and, for example, even in a case in which the position of the object 20 has changed from the distance B to the distance A (refer to FIG. 5), an overlapping portion at the light receiving position is eliminated. Thus, the amount of change in the light receiving signal on the surface of the light receiving element 14 increases as compared to the case illustrated in FIG. 3A. Specifically, the change in the position of the object 20 from the distance B to the distance A can be detected with accuracy.

In this manner, affixing the condenser lens 15 having a biconic shape to the light projecting element 11 makes it possible to increase the quantity of light from the light projecting element 11 and to make the light receiving width on the light receiving element 14 in the longitudinal direction smaller than the light receiving width in the lateral direction, and thus the sensitivity to the change in the position can be increased.

Although the condenser lens 15 has a biconic shape in the first embodiment, this is not a limiting example. For example, a cylindrical lens may be mounted to the light projecting element 11, and it suffices that a lens to be mounted to the light projecting element 11 be formed such that its curvature in the X-direction is greater than its curvature in the Y-direction. In other words, it suffices that the curvature in the direction perpendicular to the straight line passing through the center of the light projecting lens 12 and the center of the light receiving lens 13 be greater than the curvature in the direction parallel to the straight line passing through the center of the light projecting lens 12 and the center of the light receiving lens 13 along the surface that opposes the light projecting lens 12.

As described thus far, according to the first embodiment, a lens (condenser lens 15) mounted to the light projecting element 11 at a position that opposes the light projecting lens 12 and configured such that the curvature in the direction perpendicular to the straight line passing through the center of the light projecting lens 12 and the center of the light receiving lens 13 is greater than the curvature in the direction parallel to the straight line passing through the center of the light projecting lens 12 and the center of the light receiving lens 13 is provided, and thus the photoelectric sensor 100 with improved performance can be provided by increasing the quantity of light from the light projecting element 11 and by preventing the light receiving width on the light receiving element 14 in the longitudinal direction from increasing.

It is to be noted that modifications of desired constituent elements of embodiments or omissions of desired constituent elements of embodiments can be made to the invention of the present application within the scope of the present invention.

What is claimed is:

1. A photoelectric sensor, comprising:
    a light projecting element configured to project light onto an object through a light projecting lens;
    a light receiving element configured to receive the light reflected and diffused by the object through a light receiving lens, the photoelectric sensor being configured to measure or determine a distance to the object on the basis of a light receiving position on the light receiving element; and
    a single lens attached to the light projecting element at a position that opposes the light projecting lens and configured such that, for a surface of the lens facing the object, a curvature of the surface in a direction perpendicular to a straight line passing through a center of the light projecting lens and a center of the light receiving lens is greater than a curvature of the surface in a direction parallel to the straight line passing through the center of the light projecting lens and the center of the light receiving lens.

2. The photoelectric sensor according to claim 1, wherein the lens is a biconic lens.

3. The photoelectric sensor according to claim 1, wherein the lens is a cylindrical lens.

4. The photoelectric sensor of claim 1, wherein the single lens is a condenser lens.

5. The photoelectric sensor of claim 1, wherein the light projecting lens consists of one lens.

\* \* \* \* \*